Feb. 22, 1944.                F. D. BLAUVELT                    2,342,115
          MEANS FOR CONSOLIDATING IN A SINGLE BEAM LIGHT
                    FROM A PLURALITY OF SOURCES
                    Filed Nov. 21, 1941           4 Sheets-Sheet 1

INVENTOR:
Frederic D. Blauvelt
BY Louis Ourger
ATTORNEY

Feb. 22, 1944.  F. D. BLAUVELT  2,342,115
MEANS FOR CONSOLIDATING IN A SINGLE BEAM LIGHT
FROM A PLURALITY OF SOURCES
Filed Nov. 21, 1941  4 Sheets-Sheet 2
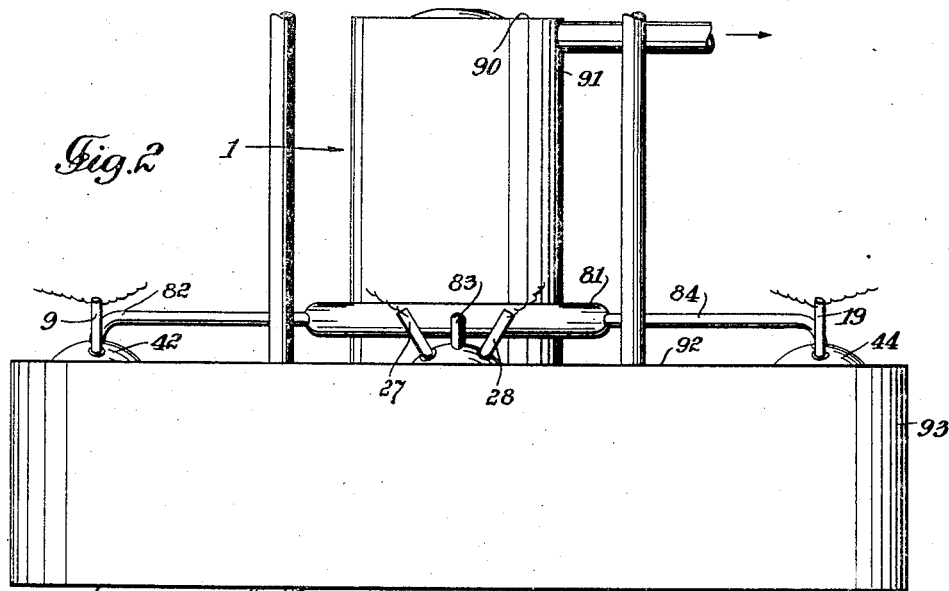
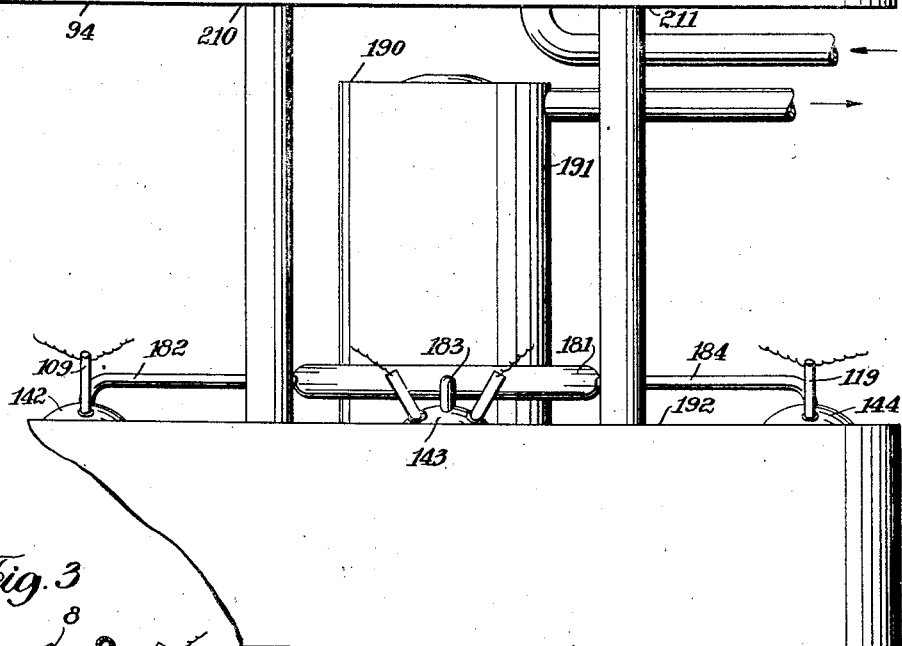
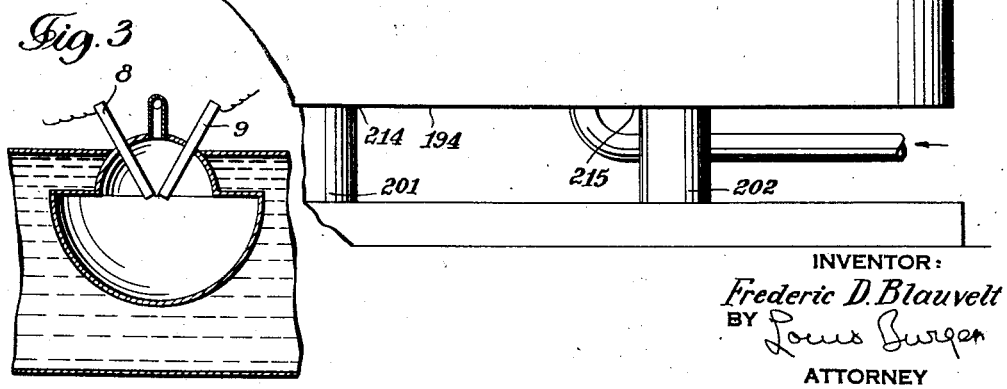
INVENTOR:
Frederic D. Blauvelt
BY Louis Burger
ATTORNEY

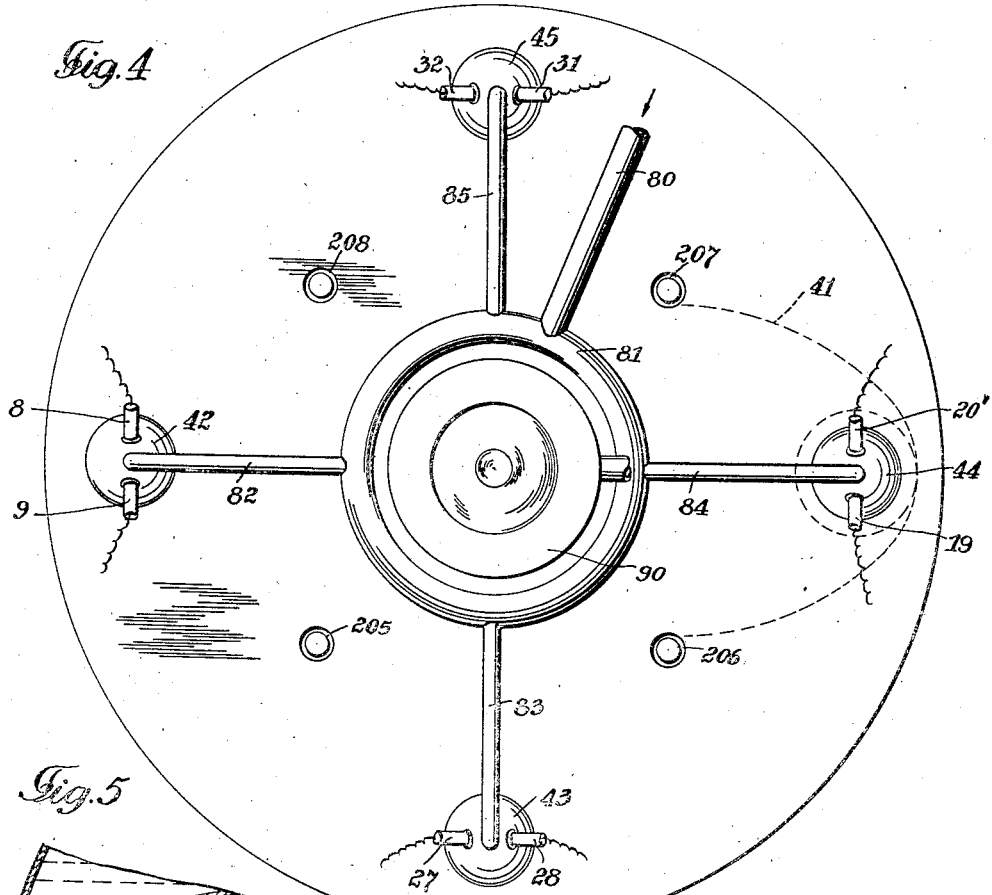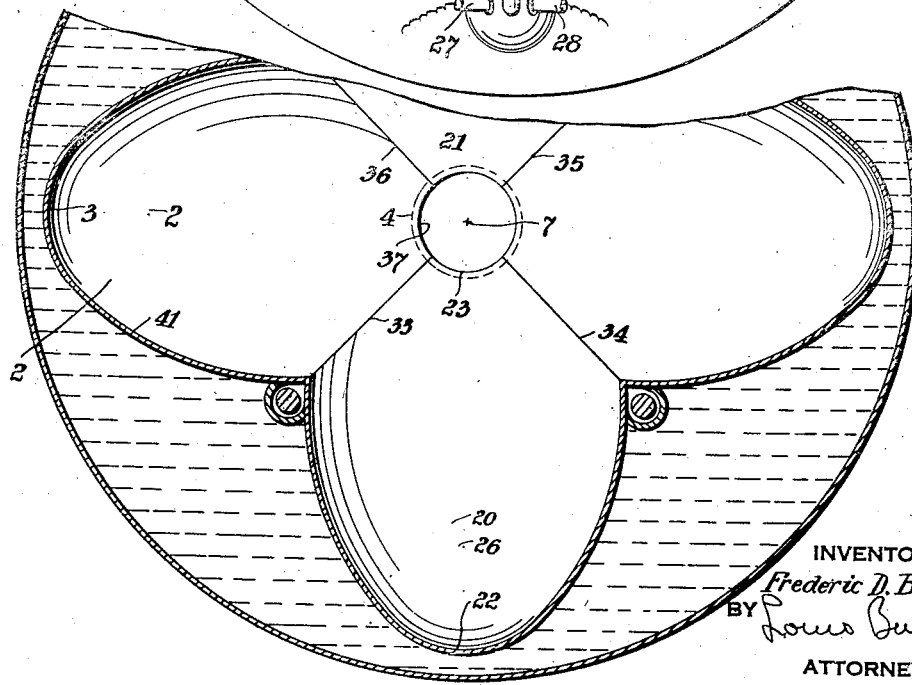

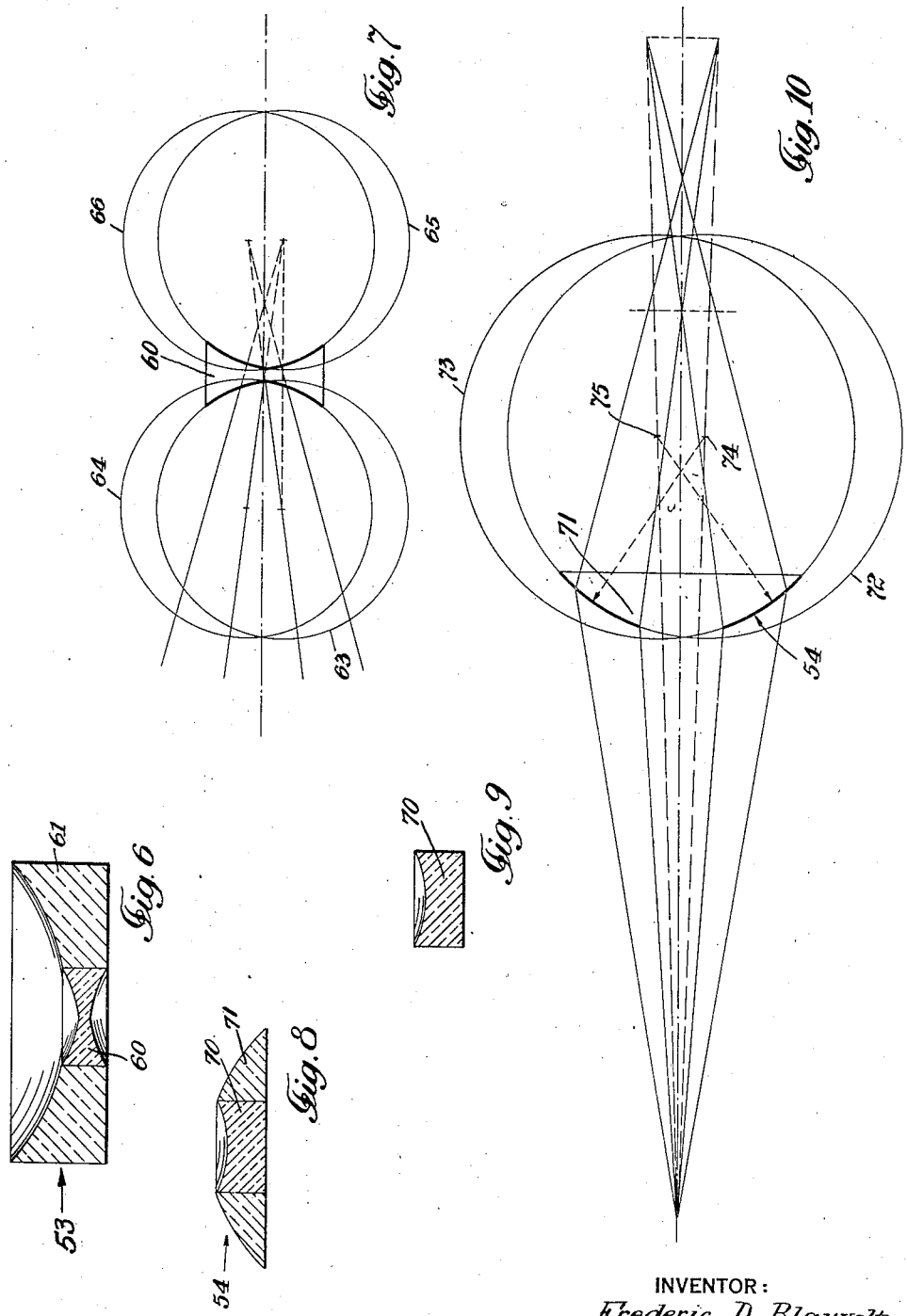

Patented Feb. 22, 1944

2,342,115

UNITED STATES PATENT OFFICE 2,342,115

MEANS FOR CONSOLIDATING IN A SINGLE BEAM LIGHT FROM A PLURALITY OF SOURCES

Frederic D. Blauvelt, Upper Montclair, N. J.

Application November 21, 1941, Serial No. 419,954

4 Claims. (Cl. 240—1)

This invention relates to a new and useful improvement in means for consolidating in a single beam light from a plurality of sources.

The invention will be fully understood from the following description, read in conjunction with the drawings in which—

Fig. 2 is a side view of the construction shown in Fig. 1;

Fig. 3 is a section through the construction shown in Fig. 1 on the plane indicated by 3—3;

Fig. 4 is a top view of the construction shown in Fig. 1;

Fig. 5 is a section through the construction shown in Fig. 1 on the plane indicated by 5—5;

Fig. 6 is an enlarged section through one of the lenses shown in Fig. 1;

Fig. 7 is an enlarged section through the central portion of the construction shown in Fig. 6;

Fig. 8 is an enlarged section through another of the lenses shown in Fig. 1;

Fig. 9 is an enlarged section through the central part of the construction shown in Fig. 8;

Fig. 10 is an enlarged section through the outer portion of the construction shown in Fig. 8;

Figure 1:
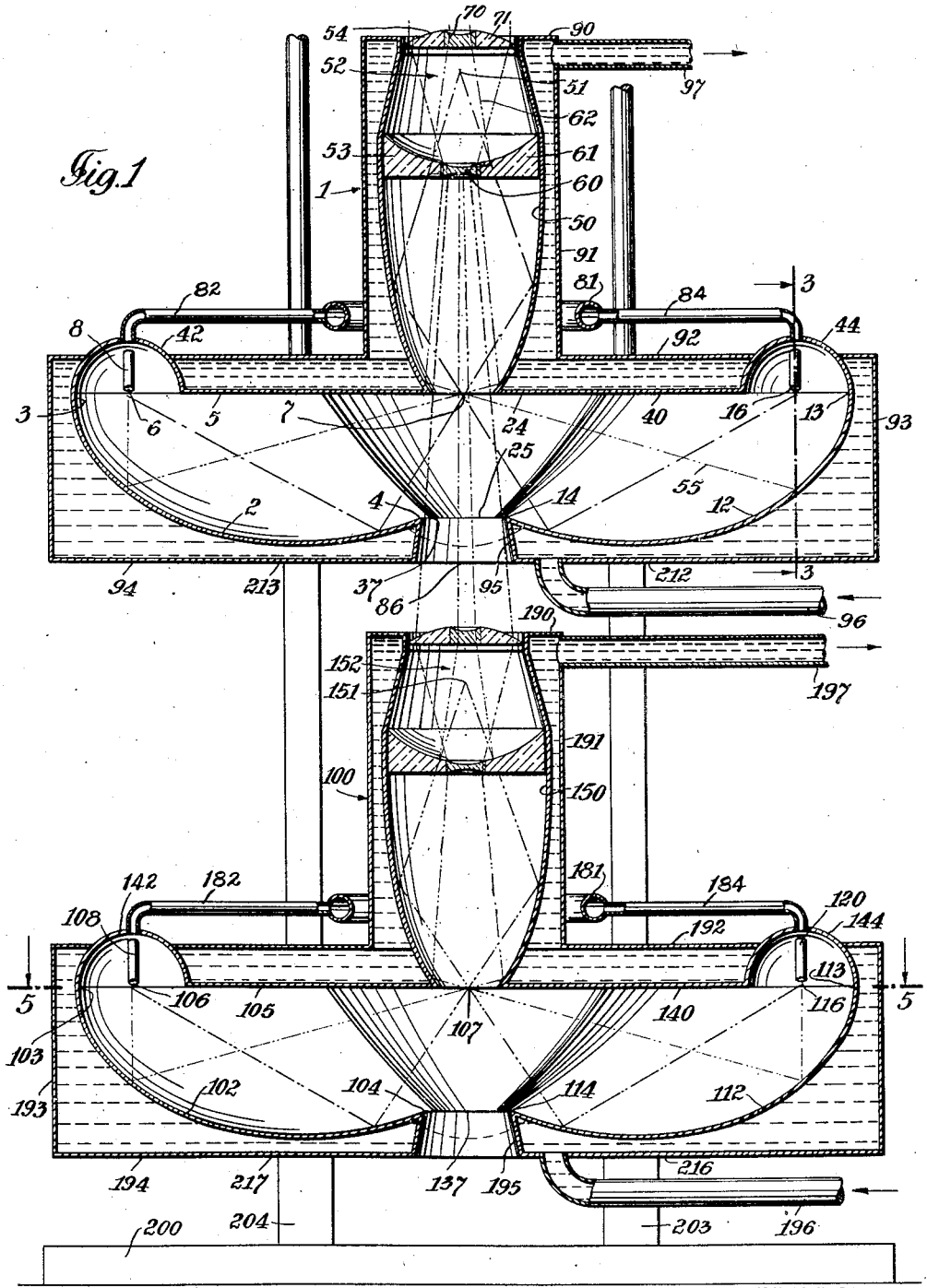
Fig. 1 is a central vertical section through an embodiment of my invention.

In the drawings means for consolidating 1 includes reflector 2 which between the limits indicated by 3 and 4 is a section of an ellipsoid (Fig. 1). The major axis of ellipsoidal reflector 2, is on line 5. The first focus of the reflector is at point 6, and the second focus is at point 7. A light source is located at focus 6. This may be an incandescent bulb or a vapor lamp of high illumination intensity, but is preferably an arc maintained between electrodes 8 and 9 (Fig. 3). Suitable means (not shown) is provided for regulating the position of the electrodes and the wattage developed in the arc.

Diametrically opposed to reflector 2 is reflector 12 which is also a segment of an ellipsoid extending between limits indicated by 13 and 14. Reflector 12 is a segment of ellipsoid having its major axis on line 5 and having one focus at 16 and its other focus at 7. A light source is located at the focus 16 corresponding to that maintained at focus 6 and similarly preferably maintained by means of an arc between two electrodes 19 and 20' (Fig. 4). By reference to Fig. 5, which is a horizontal section, it will be seen that there are in all four such reflectors, i. e., 2, 12, 20, and 21. Reflectors 20 and 21 are similarly segments of an ellipsoid. Ellipsoidal segment 20 extends between limits 22 and 23. Ellipsoidal segment 21 extends between limits 24 and 25 (Fig. 1). Ellipsoidal segment 20 has a first focus at 26 and a second focus at 7. A light source is similarly maintained at focus 26 preferably by means of electrodes 27 and 28 (Fig. 4). Ellipsoidal segment 21 has a first focus diametrically opposite focus 26 and a second focus at 7. A light source is similarly maintained at said first focus preferably by means of electrodes 31 and 32 (Fig. 4). The meeting lines of the respective reflectors, each of which is a segment of an ellipsoid, are indicated by numerals 33, 34, 35, and 36 (Fig. 5). These reflectors collectively define centrally located orifice or outlet 37 (Fig. 5). The upper edge of the reflectors collectively is spanned by cover plate 40 (Fig. 1) the plan of which is indicated by outline 41 of the reflectors collectively (Fig. 5). Cover plate 40 carries hemispherical cups 42, 43, 44 and 45. Each cup is concentric with a particular light source and the interior is a reflecting surface which serves to redirect radially incident rays through the focus into the corresponding ellipsoidal reflector. Inasmuch as rays generated at the first focus of any particular ellipsoid are reflected through the other focus and the other focus of each of the ellipsoidal reflectors coincide, it will be evident that substantially all of the rays generated at each of the four outside foci will pass through the coincident focus 7 in an upwardly direction. After passing through this point, these rays enter vertically disposed reflector 50. This reflector is also a segment of an ellipsoid having one focus at point 7 and its major axis through this point normal to cover plate 40 and normal to the major axes of ellipsoidal reflectors 2, 12, 20, and 21. The rays entering the reflector 50 would, if unmodified, meet in the other focus thereof 51. For most purposes, however, it is essential that these rays be converted into the substantially parallel or converging components of a single beam and for this purpose I utilize the di-optic condenser 52 consisting of the lens 53 of negative focal length and lens 54 of positive focal length.

As the respective beams are reflected from the surface of the central ellipsoidal reflector 50, they are swung into the horizontal field and are converged to a point which is the second focus 51 of the central ellipsoid. As all of the respective beams now emanate to a single point on the optical axis, they therefore have the characteristics of a single source and are in parallel relationship. The fields which have now become a solid superimposed field of light, are not permitted to intersect at the second focal point but as they emerge from the central circular ellipsoid, they are intercepted by the lens 53. While the respective beams are now superimposed and occupy a continuously common area symmetrical with the optical axis, the intensity in this event is unevenly distributed over the field. As is evident from Fig. 1 approximately one half of the light from any source falls on and is reflected from that part of a reflector bounded upwardly by the horizontal axis such as 5 in Fig. 1 and bounded downwardly by the point at which line 55 intersects reflector 12 or a corresponding point on any other reflector. Following the intersection of the line 5 and the line 55 with the ellipsoidal reflector 50 it will be seen that this one half of the light will pass through the central part of lens 53. This greater amount of light intensity being concentrated toward the center requires evening up. In order to accomplish this, the lens 53 intercepts the field and this lens is a bi-focal lens, the inner or central part 60 being that of a double concave type of special curvature while the outer circular part 61 is that of a plano-concave type of different curvature.

Referring to Figs. 6 and 7, it will be seen that the part 61 is of the plano-concave type and intercepts the outer part or the less intense part of the field producing a less convergent beam as indicated by line 62 (Fig. 1), the relativity of the constituent rays being changed into a more contracted beam, naturally occupying less area, and focused to a further point on the axis.

The central portion 60 of the lens 53 is made up of two curvatures on each side of the lens. These are arcs of circles 63, 64, 65 and 66 which intersect at the optical axis and whose radii of generation and centers of curvature are located on opposite sides of the optical axis on temporary axes, symmetrically parallel to the optical axis. Therefore, the points of these curvatures where refraction is nil, are points in line with the temporary axis out of line with the optical axis. The function of this lens is to spread the axial rays into a circular field of light diverging them to the desired extent. Likewise the refraction is greater toward the outside of the lens and therefore as we move toward the periphery, the rays will undergo a greater spread enlarging the beam radially and effecting a ratio of intensity to square area consistant throughout the entire field.

Now that we have separated the total beam into two parts, a solid central field and a circular field and spread them over the desired area evening up the intensity over the total field, it is necessary to coordinate them again. In order to do this, the lens 54 intercepts the beam at the proper plane. This must be at a plane of intersection of the two parts of the field where the intensity has been corrected. At this point, they must be coordinated and again made to center at the optical axis. Referring to Figs. 8, 9, and 10 the center or solid part of the field must be passed through a second plano-concave lens 70 producing a slightly less convergent beam, focusing at the desired point on the axis. This portion of the beam at all times has been in coordination with the optical axis.

The circular field which at this point is not in coordination with the optical axis must be brought to focus at the same point on the optical axis as the central part of the field. In order to accomplish this, the rays must pass through a convex lens 71 to make the beam smaller. The circular field now emanates from points out of line with the optical axis. It is well understood that a beam emanating from a point out of line with the axis will focus at a point correspondingly out of line provided a lens of uniform circular shape with its center of curvature on the optical axis is used.

In order then to accomplish the desired relation of alignment of the foci, it is necessary to construct temporary axes between the desired focal points upon which axes the circles 72 and 73 are constructed having their centers of curvatures located on these lines of axes at the points 74 and 75. These circles are then generated by radii having their points on opposite sides of the optical axis. Since every point in each of these circles described is in coordination with the desired foci, then the darkened arcs of the circles representing the circular lens 71 will again center the circular field on the optical axis at the desired point. The convex curvature corresponding entirely to the two temporary axes and to the focal points on those axes, one of which is the desired focal point and the lens having its nil point of refraction on either side of the optical axis, the two parts of the beam are then brought into coordination with the optical axis, having been focused again to a single point of the optical axis.

This now produces a combined field of light of all the light beams brought into the system in which the rays from the individual beams are completely coordinated with the optical axis and may be projected in continuous symmetrical relation thereto, and occupy a continuously common area.

Where the light sources employed are arcs, as shown in the preferred embodiment of my invention, some fume is or may be developed from the electrodes and in order to prevent this from reducing the light intensity, I provide the duct 80 (Fig. 4) into which a suitable gas, inert in relation to the electrodes, such as hydrogen or nitrogen, is introduced. This moves through ring manifold 81 to the radial outlets 82, 83, 84 and 85 by which it is discharged (Fig. 1) into the upper ends of the hemispherical reflectors. This gas sweeps the fume out of the reflectors discharging it through the bottom outlet 86 (Fig. 1).

It will now be evident that the reflectors 2, 20, 12 and 21, together with the reflector 50, cover plate 40, and the respective cup-shaped reflectors, constitute a chamber. It will also be evident that a great deal of heat will necessarily be developed in the operation of a number of light sources of great intensity in a restricted space, and for this reason I surround the said chamber with a jacket for the circulation of a cooling fluid. This jacket is made up of the top closure 90, the tubular section 91, the plate 92, tubular section 93, the bottom closure 94 and the frustro-conical member 95. (Fig. 1.) Cooling fluid in either liquid or gas phase may be introduced through the inlet 96, passing off through the outlet 97.

It is evident from the foregoing that the means hereinabove described is capable of consolidating in a single beam light from the plurality of sources located at the outside focus of each of the reflectors. For some purposes it may be unnecessary or even undesirable to bring the consolidated rays into substantially parallelism and in this case the di-optic condenser 52 will be unnecessary.

In using the word "light" in the description and claims I do not mean to limit myself to light within the range of the visible spectrum, but, pro contra, mean to comprehent light within the infra-red and ultra-violet ranges. If it is desired that the light passing from the means to be predominantly infra-red or ultra-violet, the light sources will be appropriately selected to this end. If the light consolidated is predominantly within the visible range, and the di-optic condenser is used, the means may be employed as a searchlight of spotlight for the projection of a beam of high intensity. If the means is used to consolidate light that is predominantly infra-red or ultra-violet, the device may, for example, be used for a variety of purposes, including therapeutic treatment. In such case it may even be desirable that the rays emanated from the device be made to diverge and spread over a considerable area and in this case the lens 54 of the positive focal length may be replaced by a lens of negative focal length.

The device hereinabove described may, of course, be employed as an independent unit. It is, however, one of the advantages of the invention that this device may be employed in conjunction with other similar devices to provide a further concentration of light from other sources as will be evident from the following description.

Referring to Fig. 1, the means 100 includes the reflector 102 identical in form with 2 hereinabove described. This is a segment of an ellipsoid extending from 103 to 104 and having a major axis on the line 105. One focus of the ellipsoid is located at 106 and the other focus at 107. A light source is located at 106 which may, for example, be an arc maintained between electrodes 108 and 109; electrode 108 appears in Fig. 1 while the companion electrode 109 appears in Fig. 2. This major axis is parallel to 5, hereinabove described. This ellipsoidal reflector is diametrically opposite to the reflector 112 which is identical in form with the reflector 12, hereinabove described and is a segment of an ellipsoid extending from 113 to 114. This ellipsoid has a major axis on the line 105, one focus at 116 and its other focus at 107. A light source is located at the focus 116 which may, for example, be and arc maintained by electrodes 119 and 120. In all there are four such ellipsoidal reflectors in form identical with those shown in Fig. 3. These reflectors define the bottom outlet 137. The space within the reflectors and below the major axis 105 is overlain by the cover plate 140 identical in form and function with the cover plate 40, hereinabove described. This carries four hemispherical cups concentric with the four outside foci 142, and 144 (Fig. 1) and 143 (Fig. 2). These serve to reflect back radially light incident from each corresponding light source and such light, together with that radiated downwardly from each corresponding light source on meeting the associated ellipsoid reflector, will be reflected upwardly passing through the coincident focus 107. It is, therefore, apparent that the major part of the light meets the reflector 150 which is also a segment of an ellipsoid having a first focus at the point 107 and a second focus at the point 151. The major axis of this ellipsoid passes thru the point 107 and is normal to the plane which includes the major axes of four ellipsoids. I may similarly provide the di-optic condenser 152 the function of which is hereinafter described.

For the purpose of sweeping out of the device any fume generated at the electrodes, I similarly provide the ring manifold 181 corresponding to 81 hereinabove described, and four radial outlets corresponding to 82—85 hereinabove described, of which three, i. e., 182, 183, and 184 are shown in Fig. 2. These discharge into the tops of the four hemispherical reflectors and by means of the gas so introduced which may, as stated, by hydrogen or nitrogen, the fume is swept out through the bottom outlet 137. For the purpose of carrying away the heat generated at the light sources, I similarly provide the cooling jacket consisting of the top closure 190, tubular section 191, plate 192, tubular section 193, bottom closure 194 and frustro-conical member 195. Cooling fluid which may either be liquid or gas is introduced through the inlet 196 passing off through the outlet 197.

If the two devices are to be jointly employed for the projection of a beam of parallel rays, the dioptic condensers will be similar in form except that di-optic condenser 152 will bring the rays to converge at focus 51 to be diverged by lens 60 as hereinabove described. If the device is to be utilized for some other purposes, as, for example, illumination or therapeutic treatment, it may be advisable to have the di-optic condenser 152 adapted to the generation of a beam of rays converging at focus 51 while di-optic condenser 52 is adapted to spread or distribute the rays in any manner desired.

I am not limited to the use of two such devices in series, but, pro contra, may employ a larger number in this manner thereby consolidating the rays from a greater number of independent light sources.

For convenience in operation for assembly and the replacement of light sources, or electrodes that may be unfit for further use, I provide additionally means whereby these devices may be readily and quickly assembled in cooperative relationship and whereby they may be easily separated when desired. This includes the base member 200 (Fig. 1) provided with four uprights of which 201 and 202 are visible in Fig. 2 while 203 and 204 are shown in Fig. 1. These uprights pass through tubes 205, 206, 207 and 208 (Fig. 4). Immediately below the plate 94 the rods are of increased diameter providing the shoulders of which 210 and 211 appear in Fig. 2, while 212 and 213 appear in Fig. 1.

Immediately below the plate 194 the rods are again of increased diameter to provide the shoulders of which 214 and 215 appear in Fig. 2 while 216 and 217 appear in Fig. 1.

The foregoing description is for purposes of illustration and not of limitation, and it is, therefore, my intention that the invention be limited only by the appended claims or their equivalents in which I have endeavored to claim all inherent novelty.

I claim:
1. Means for consolidating in a single beam light from a plurality of sources comprising a plurality of reflectors, each defining a section of an ellipsoid having a major axis, said major axis lying in a common plane and each of said reflectors comprising the internal surface of an ellipsoid lying at least principally on one side of said common plane, a light source adjacent one focus of each of said ellipsoids, the other foci of said ellipsoids being substantially coincident, a reflector defining the internal section of an ellipsoid having a major axis and having a focus substantially in common with said coincident foci, said last mentioned major axis being normal to the major axes of said first mentioned ellipsoids, and said reflector lying wholly on the other side of said common plane, said reflectors collectively defining a chamber wherein light may pass from said light sources through said common focus into said last mentioned reflector, said last mentioned reflector defining an outlet adjacent the other focus of said last mentioned ellipsoid.

2. Means for consolidating in a single beam light from a plurality of sources comprising a plurality of reflectors, each defining a section of an ellipsoid having a major axis, said ellipsoids having one focus in common and their major axes in a common plane, said reflectors lying at least principally on one side of said common plane, a light source adjacent the other focus of each of said reflectors, at least one substantially hemispherical reflector concentric with a light source on the other side of said common plane, a reflector defining a section of an ellipsoid on the same side of said common plane as said hemispherical reflector having a focus substantially coincident with said common focus, said last mentioned ellipsoid having a major axis and said major axis being normal to the major axes of said first mentioned ellipsoids, said reflectors collectively defining a chamber wherein light may pass from said light sources through said common focus into the last mentioned reflector, said last mentioned reflector defining an opening adjacent the other focus of said last mentioned ellipsoid.

3. Means for consolidating in a single beam light from a plurality of sources comprising a plurality of reflectors, each defining a section of an ellipsoid, said ellipsoids having one focus in common and their axes in a common plane, a light source adjacent the other focus of each of said ellipsoids, a reflector defining a section of an ellipsoid having a focus substantially coincident with said common focus and its major axis normal to said common plane, said reflectors collectively defining a chamber wherein light may pass from said light sources through said common focus into said last mentioned reflector, said last mentioned reflector defining an outlet adjacent the other focus of said last mentioned ellipsoid, said chamber defining an inlet opposite said outlet on the projected major axis of said last mentioned ellipsoid and separate from the foregoing, a first reflector defining a section of a first ellipsoid, a light source adjacent one focus of said ellipsoid, a second reflector defining a section of a second ellipsoid, one focus of said second ellipsoid being substantially coincident with the other focus of said first ellipsoid, said first and second reflectors collectively defining a chamber wherein light may pass from said light source through said common focus into said second reflector, said second reflector defining an outlet adjacent the other focus of said second ellipsoid on the major axis of said second reflector, a di-optic condenser adjacent said outlet, the said major axis being substantially coincident with the first mentioned major axis.

4. Means according to claim 3 comprising in addition a di-optic condenser adjacent said first mentioned outlet.

FREDERIC D. BLAUVELT.